United States Patent Office 3,736,292
Patented May 29, 1973

---

3,736,292
METHOD OF REDUCING PHENOLIC WASTE
James H. Thayer, Lanesboro, and Edward C. Y. Fan, Pittsfield, Mass., assignors to General Electric Company
Filed Mar. 29, 1971, Ser. No. 128,988
Int. Cl. C08g 5/06
U.S. Cl. 260—57 R          11 Claims

ABSTRACT OF THE DISCLOSURE

Phenol content is markedly reduced in waste discharged from apparatus used for producing phenol-aldehyde resins. Aqueous solutions produced by the reaction between the phenol and aldehyde at different stages of the reaction and containing different proportions of phenol are mixed together at a temperature in the range of about 30° C. to about 45° C. to provide rapid separation into two solution layers, of which one contains low phenol concentration and may be discharged as waste, and the other contains high phenol concentration which is returned to the reaction vessel for further use in resin production. The low phenol waste solution thus discharged enables a reduction in pollution of streams into which products of the resin process are usually discharged.

---

The present invention relates to production of phenolic resins, and more particularly concerns reduction of undesirable waste products resulting from such resin production.

It is a principal object of the invention to reduce the pollution of streams into which waste from production of phenolic resins is discharged.

It is another object of the invention to provide a more economical process of making phenolic resins.

Particular objects of the invention are to substantially reduce the phenolic content of waste discharged from phenolic resin production, and to re-use in such resin production a substantial proportion of phenol-containing waste solution resulting from such process.

Still another object of the invention is to provide a method for rapidly extracting re-usable phenol solutions from phenol-containing waste liquids.

Other objects and advantages will become apparent from the following description and the appended claims.

With the above objects in view, the present invention concerns a process of manufacturing phenolic resins in which phenol is reacted with a aldehyde, comprising the steps of obtaining an aqueous solution produced during such reaction containing a relatively low proportion of phenol, mixing this solution with a second aqueous solution produced after such reaction and containing a relatively high proportion of phenol which is substantially in emulsion therein, while maintaining the mixture at a temperature of about 30°–45° C. for rapidly separating the thus obtained mixture into discrete layers of solutions respectively having relatively low and relatively high phenol concentration, and recovering the solution in the discrete layer having relatively high phenol concentration. The latter solution may be re-used for the resin manufacturing process, while the other solution containing relatively low phenol concentration may be discharged as waste which may be readily treated to remove the remaining phenol content therefrom.

Figure 1:
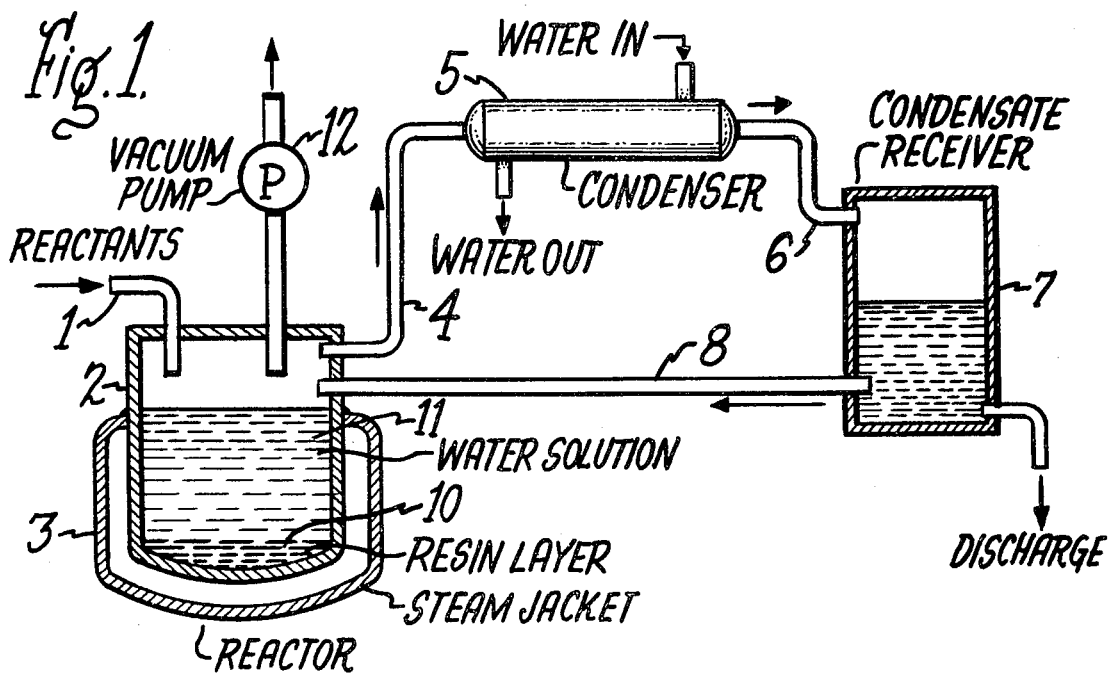
Figure 2:
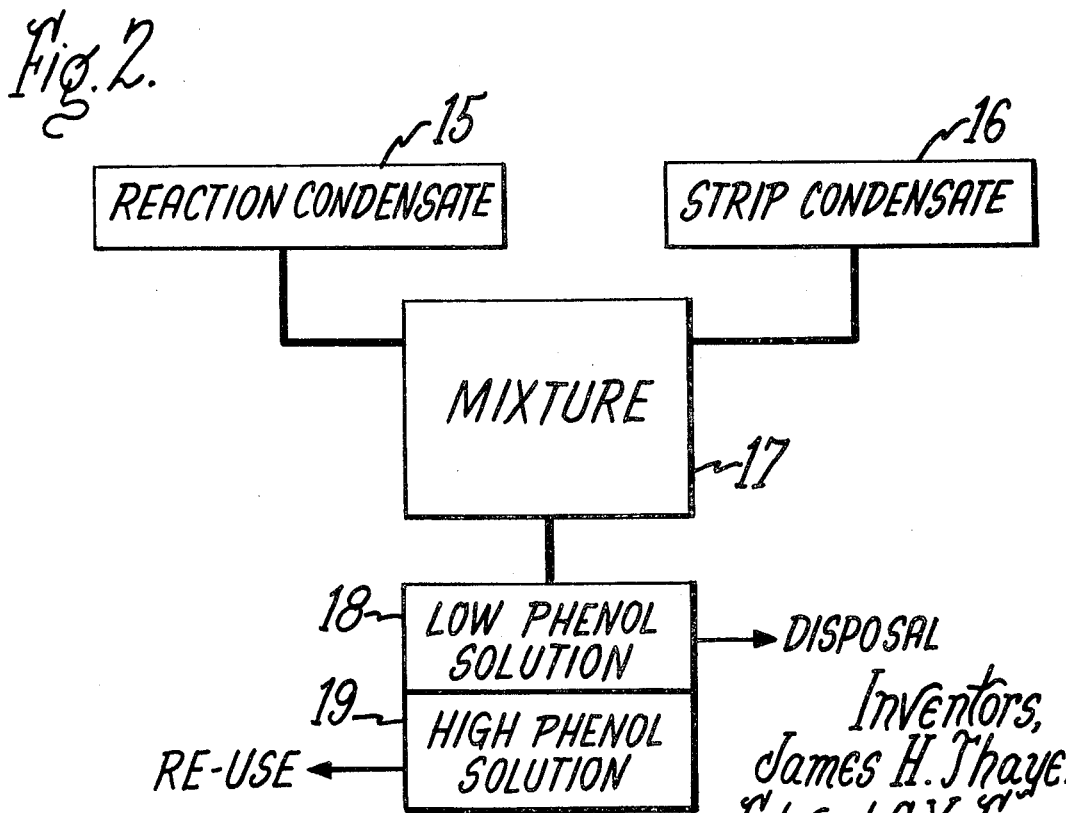

The invention will be better understood from the following description taken in conjunction with the accompanying drawing, in which:

FIG. 1 is a schematic view of apparatus for making phenol-aldehyde resin to which the present invention is applicable; and FIG. 2 is a flow diagram of the process of the invention utilizing solutions derived from the apparatus of FIG. 1.

Referring now to the drawing, and particularly to FIG. 1, there is shown apparatus of known type which may be used for reacting an aldehyde, such as formaldehyde, and phenol for producing phenol-aldehyde resins. The method for making such resins is well-known and is described in many places in the literature. Such a method of reacting phenol and aldehyde in the presence of a suitable catalyst is disclosed, for example, in U.S. Pat. 2,750,354, wherein the nature of the chemical reaction, the various types of phenols and aldehydes which may be employed, the reaction conditions, the proportions of the reactants, etc., are fully disclosed.

As shown in the diagrammatic view of FIG. 1, the reactants are introduced through feed pipe 1 into closed reaction vessel 2 which has a steam jacket 3 for heating the contents of the reaction vessel. In a usual process, the phenol in liquid form and a suitable acid catalyst are first introduced into reaction vessel 2, and the aldehyde compound, typically paraformaldehyde in granular form, is then added gradually through feed pipe 1. The reactants, as well understood in the art, are added in stoichiometric proportions. Initially, the reaction vessel is heated to a temperature of about 80° C. by means of steam jacket 3. With the continuing addition of the aldehyde, the temperature of the vessel contents rises to about 150° C. due to the exothermic nature of the reaction between the aldehyde and phenol. As a result of the reaction, phenol-aldehyde resin 10 is formed and settles to the bottom of reaction vessel 2 where it remains in liquid form below the supernatant water solution 11 of unreacted phenol and aldehyde. During the reaction, gaseous reaction products including vaporized water of formation are given off, and such gases, including vaporized phenol, pass through vapor line 4 to condenser 5 where the vapors are condensed to a liquiud which passes through line 6 to a condensate receiver 7. By means of return line 8, the condensate in receiver 7 is returned to reactor vessel 2 for further reaction.

After all of the desired amount of aldehyde has been added to the reaction vessel 2, and while reaction is still continuing, it has been the practice in the past to remove from receiver 7 the condensate formed during the reaction, which is known as the "reaction condensate" and which contains normally about 10–12% by weight of phenol in water solution, and to dispose of this solution through discharge lines to a stream or waste treatment facilities.

After the reaction in vessel 2 has proceeded to substantial completion, the supernatant solution of unreacted phenol and aldehyde is vaporized due to the heat in the vessel and the reduced pressure therein obtained by use of vacuum pump 12, so that the vapor passes into line 4 for passage through condenser 5 and to receiver 7. The solution, which is known as "strip condensate" and contains about 45–50% by weight phenol, has also in the past been disposed of as waste. Although the strip condensate has a relatively large unreacted phenol content, this liquid has not been found suitable for re-cycling and re-use in the described process because the phenol is largely in emulsified condition therein, and to recover the phenol would require a prolonged period of detention, e.g., over 12 hours, of the strip condensate in an undisturbed settling tank to allow the phenol to separate out into a discrete layer which could be removed for re-use.

In accordance with the invention, a method has been found for readily recovering a large part of the unreacted phenol thus previously wasted in the known processes. As a result, there is provided a practical method for markedly reducing phenolic waste from large scale phenol-aldehyde resin manufacture and thereby reduce pollution of streams into which such waste is discharged, as well as to provide for re-use of the unreacted phenol in the resin manufacturing cycle and thus obtain substantial savings in this process.

To this end, as indicated in the flow diagram of FIG. 2, the reaction condensate 15 and the strip condensate 16 are mixed together in a suitable vessel as indicated in step 17. In a usual process, the proportion of phenol in the mixture is in the range of about 25%–40% and the temperature of the mixture is held in the range of about 30°–45° C., and preferably at about 35° C. As a result, the mixture in a short time, usually less than 1 minute, separates out into discrete layers 18 and 19, with upper layer 18 having about 8%–12% phenol in solution and lower layer 19 having about 70%–75% phenol in solution. The high phenol solution layer 19 may then be readily drawn off and returned to reaction vessel 2 for further use in the manufacture of phenolic resins. Solution 18 is sufficiently low in phenol content to be disposed of through usual sewage treatment facilities, where the remaining phenol is readily removed by suitable treatment, such as biological oxidation reactions commonly employed in such facilities.

Various methods may be employed for mixing the strip condensate with a suitable liquid for obtaining the desired discrete layers of phenol solution. In one method which has proved particularly practical, the strip condensate from a previous batch process of making phenolic resin as described above is placed in a thermally insulated mixing tank, and the reaction condensate from the following batch process is pumped into the mixing tank through a pipe extending into the strip condensate solution, so that sufficient mixing action takes place due to the force of the flow of the reaction condensate below the surface of the strip condensate. In such a process, in which the volume of reaction condensate added is usually greater than that of the strip condensate, the strip condensate typically is at a temperature of about 25° C. and the reaction condensate is about 35°–40° C., so that the mixture attains an intermediate temperature within the desired range as described above. As a result, separation of the mixture into two layers takes place very rapidly without the necessity for mechanical mixing means or the use of temperature control means. If desired, however, the mixing tank may be equipped with heating means or mechanical mixing means if these should be required for particular circumstances.

If in certain situations the reaction condensate is, for any reason, not available or not desired for use in mixing with the strip condensate, plain water without any phenol may be mixed with the strip condensate at the specified temperature to provide the layer separation desired, in accordance with the invention. While in general the reaction condensate used will have a phenol content of around 10%–12%, it may in some cases contain up to about 15% phenol. Thus, the solution mixed with the strip condensate may, in the broad aspects of the invention, contain a range of 0 to about 15% phenol.

While the range of phenol content of the mixture is preferably about 25%–40%, in a broad aspect of the invention this range may be about 20%–45% phenol. With an amount of phenol below this range, insufficient phenol is present in lower layer 19 to make the process practical. With amounts of phenol above this range, it is necessary to use temperatures above 45° C. for the mixture to provide layer separation, and under these conditions the volume of lower layer 19 is reduced to an impractical amount. Further, it has been found that the use of mixture temperatures substantially below the 30°–45° C. range mentioned above results in unduly prolonging the time necessary for the described discrete layers to separate out.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. In the process of manufacturing phenolic resins in which phenol is reacted with an aldehyde, the steps of removing after such reaction an aqueous solution produced from said reaction containing at least about 40% by weight of phenol wherein the phenol is substantially in emulsion therein, mixing said aqueous solution with an aqueous liquid having from 0 to about 15% by weight of phenol in solution therein while maintaining the mixture at a temperature of about 30°–45° C. for rapidly separating the thus obtained mixture into discrete layers of solutions of which one layer has a substantially higher phenol concentration than the other layer, and recovering said solution in said discrete layer having the higher phenol concentration.

2. A method as defined in claim 1, wherein said aqueous liquid is a product of reaction of phenol and aldehyde which is produced in such reaction prior to said aqueous solution.

3. A method as defined in claim 2, wherein said aqueous liquid contains about 10%–12% by weight of phenol.

4. A method as defined in claim 3, wherein said aqueous solution contains about 45%–50% by weight of phenol.

5. A method as defined in claim 2, wherein said recovered solution is re-used in said phenol-aldehyde reaction process.

6. A method as defined in claim 5, wherein said solution of said other layer is disposed of as waste.

7. A method as defined in claim 4, wherein said other of said discrete layers contains about 8%–12% by weight phenol and said one discrete layer contains about 70%–75% by weight phenol.

8. A method as defined in claim 2, wherein said aqueous liquid is obtained as the condensate of vapor formed during said reaction.

9. A method as defined in claim 8, wherein said aqueous solution is obtained as the condensate of vaporized liquid derived from said reaction.

10. A method as defined in claim 1, wherein said mixture contains about 20%–45% by weight of phenol.

11. A method as defined in claim 10, wherein said mixture contains about 25%–40% by weight of phenol.

References Cited

UNITED STATES PATENTS 2,750,354    6/1966    Merriam    260—57 R
3,308,096    3/1967    Ivanov et al.    260—57 R LORENZO B. HAYES, Primary Examiner